(12) United States Patent
Chaturvedi et al.

(10) Patent No.: US 7,106,706 B1
(45) Date of Patent: Sep. 12, 2006

(54) METHOD AND SYSTEM FOR PROVIDING DIAL-UP DATA SESSIONS

(75) Inventors: Pawan Chaturvedi, Overland Park, KS (US); Brian L. Senogles, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1005 days.

(21) Appl. No.: 09/893,137

(22) Filed: Jun. 27, 2001

(51) Int. Cl.
*H04Q 7/00* (2006.01)
*H04L 12/66* (2006.01)

(52) U.S. Cl. ............... 370/329; 370/352; 370/401; 709/227

(58) Field of Classification Search ............ 370/352, 370/353, 354, 355, 356, 401, 310.2; 713/153–155; 455/455, 451
See application file for complete search history.

(56) References Cited

U.S. PATENT DOCUMENTS

| | | | | |
|---|---|---|---|---|
| 5,533,019 A * | 7/1996 | Jayapalan | ............... | 370/352 |
| 6,061,346 A * | 5/2000 | Nordman | ............... | 370/352 |
| 6,226,260 B1 * | 5/2001 | McDysan | ............... | 370/216 |
| 6,236,660 B1 * | 5/2001 | Heuer | ............... | 370/409 |
| 6,434,139 B1 * | 8/2002 | Liu et al. | ............... | 370/352 |
| 6,473,609 B1 * | 10/2002 | Schwartz et al. | ............... | 455/406 |
| 6,529,497 B1 * | 3/2003 | Hjelm et al. | ............... | 370/347 |
| 6,587,684 B1 * | 7/2003 | Hsu et al. | ............... | 455/419 |
| 6,608,832 B1 * | 8/2003 | Forslow | ............... | 370/353 |
| 6,678,524 B1 * | 1/2004 | Hansson et al. | ............... | 455/445 |
| 6,826,406 B1 * | 11/2004 | Vialen et al. | ............... | 455/450 |
| 6,941,465 B1 * | 9/2005 | Palekar et al. | ............... | 713/150 |
| 2001/0043577 A1 * | 11/2001 | Barany et al. | ............... | 370/328 |
| 2002/0085514 A1 * | 7/2002 | Illidge et al. | ............... | 370/329 |
| 2002/0089958 A1 * | 7/2002 | Feder et al. | ............... | 370/338 |

OTHER PUBLICATIONS

U.S. Appl. No. 10/086,017, filed Feb. 2002, Chaturdevi et al.*
3Com Total Control, "Interworking Function, A wireless CDMA data solution," (1998).

* cited by examiner

*Primary Examiner*—Doris H. To
*Assistant Examiner*—Ian N. Moore

(57) ABSTRACT

A method and system for responding to a request to establish a dial-up data session from a user terminal to a remote destination. Instead of initiating a dial-up data session, the user terminal will initiate a packet-data session with a translation node and will provide the translation node with information about initiating the dial-up data session. The translation node will then initiate circuit-data session with the remote destination and will bridge the packet-data session with the circuit-data session, so as to establish an end-to-end data session between the user terminal and the remote destination. Advantageously, by setting up a packet-data session between the user terminal and the translation node, the underlying data may be carried over an access link at a higher service level than would normally be provided for a circuit-data session carried over that access link. Further, this can be done transparently to a user.

21 Claims, 7 Drawing Sheets

METHOD AND SYSTEM FOR PROVIDING DIAL-UP DATA SESSIONS

BACKGROUND

1. Field of the Invention

The present invention relates to telecommunications and, more particularly, to the establishment of dial-up data sessions, such as between a wireless user terminal and a remote access server.

2. Description of Related Art

The explosive growth of telecommunications has ushered in a new era of convenience and productivity. Users are now commonly able to establish data sessions with remote computers via dial-up access over a telephone circuit. For instance, a user can operate a local computer equipped with a modem to place a telephone call to a remote computer equipped with a modem. When the remote modem answers the call, the remote modem and local modem can agree on a communication protocol and then begin to exchange useful data.

One of the most common applications of dial-up data service is to provide remote access to a network, such as a corporate network or the Internet, for example. In this arrangement, the remote computer/modem is typically a remote access server (also known as a "network access server"). The remote access server may sit as a node on the network and include one or more modems for receiving dial-up data calls from user terminals. When a user operates a local terminal to establish a dial-up data connection with the remote access server, the user may then be able to access resources on the network, such as e-mail and file services for instance.

The advent of wireless telecommunications, such as cellular telephony, has extended the availability of dial-up data access. Just as a user can operate a cellular telephone or other mobile station to place a voice call to virtually any telephone number, a user can operate a suitably equipped mobile station to place a dial-up data call to virtually any remote computer.

In typical operation, a user terminal such as a notebook computer or personal digital assistant ("PDA") can be connected or otherwise equipped with a wireless modem or can include a modem and be coupled or otherwise equipped with a mobile station for placing wireless telephone calls. A user can then operate the terminal to place a wireless dial-up data call to a remote computer/modem.

In a cellular telephone system, each cell is defined by a radiation pattern from a respective base station antenna. The base station is then coupled or equipped with a switch or other gateway, which provides connectivity with a transport network such as the public switched telephone network ("PSTN") for instance. A wireless user terminal operating in a cell can thereby communicate with the base station over a radio frequency air interface, and communications can then be carried via the PSTN to virtually any remote communication terminal.

Thus, to place a dial-up data call from a wireless user terminal equipped with a modem, a user can instruct the terminal to call a telephone number of a remote computer equipped with a modem. The wireless terminal would then initiate a telephone call to that number via the air interface and switch. Once the remote modem answers the call, the two ends can agree on a communication protocol and then begin to exchange data.

SUMMARY

In most wireless communication systems, dial-up data connections are limited by the bandwidth allocated to circuit-switched calls over the air interface. This limitation stems from the fact that the primary type of traffic carried in such calls is voice, which, through use of effective vocoding (voice-coding) algorithms, can be transported over the air interface at low bandwidth with little degradation in quality. Constraining bandwidth for these calls enables service providers to efficiently use valuable and expensive radio spectrum. But since dial-up data calls are placed to a circuit-terminated destination like voice calls, dial-up data calls suffer from the same restriction on bandwidth.

For example, in a typical wireless communication system, voice calls—and thereby dial-up data calls—may be limited to a maximum throughput of 9.6 or 14.4 kilobits per second (kbps) over the air interface. By comparison, landline voice and dial-up data calls may be carried at speeds of up to 56 kbps over the PSTN (via a 64 kbps channel that can support high speed analog modems). As a result of this air-interface bottleneck, users who want to place dial-up data calls are more likely to place them over the landline telephone system than over a wireless communication system, which clearly presents a problem for wireless service providers.

The present invention is directed to an improved mechanism for providing dial-up data sessions in a way that approaches the performance of landline dial-up connections and therefore makes wireless dial-up data sessions much more attractive.

According to an exemplary embodiment of the invention, when a user instructs a user terminal to establish a dial-up data session with a given remote computer, the user terminal will not place a circuit-switched telephone call to that remote computer as would normally be expected. Rather, the user terminal will initiate a packet-switched data session with an intermediate node and provide that intermediate node with the telephone number of the remote computer. The intermediate node will then place a call to that telephone number, thus establishing a circuit-switched data session between the intermediate node and the remote computer, and the intermediate node will bridge the packet-switched data session with the circuit-switched data session. As a result, dial-up data will be communicated as packet-data from the user terminal to the intermediate node and then as circuit-data from the intermediate node to the remote computer, so as to establish an end-to-end data session between the user terminal and the remote computer.

Advantageously, in a typical wireless communication system, a higher bandwidth is allocated over the air interface for sessions designated as "data" sessions (e.g., packet-data) than for sessions designated as "voice" sessions. In fact, according to recent industry standard recommendations, such as 3G 1xRTT for instance, data sessions can be carried over the air interface with throughputs of up to 144 kpbs or greater. Thus, by setting up the end-to-end data session as a packet-data session over the air interface, it is possible to take advantage of this higher available data rate over the air interface.

By splitting the end-to-end data session into a packet-data session (generally a "data" session) over the wireless access segment and a circuit-data session (e.g. landline dialup session) terminating at the remote computer, the end-to-end throughput will be no worse than the lowest throughput of these two segments. If the packet-data session over the wireless access segment has a throughput higher than the circuit-data session, then the circuit-data session will be the bottleneck and the user will be provided with circuit-switched (landline-like) dialup experience. On the other hand, if the packet-data session over the wireless access segment has a throughput lower than the circuit-data session, then the packet-data session will be the bottleneck, but the user will provided with a wireless packet-data like experience. This arrangement can thereby increase wireless dial-up throughput many times beyond that traditionally available.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Overview

Figure 1:
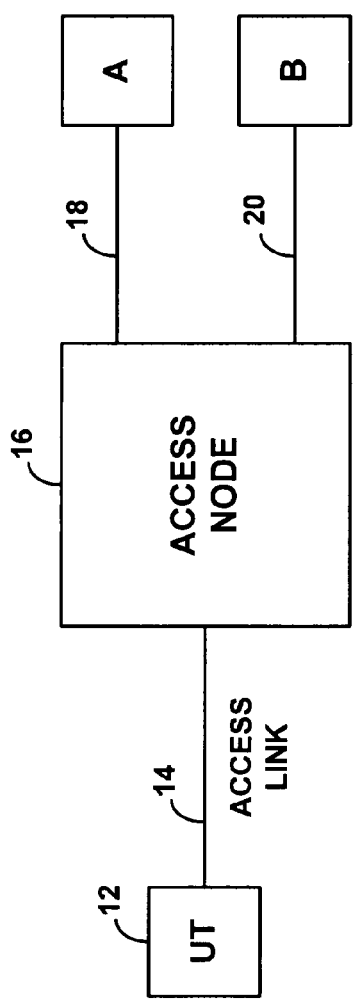
FIG. 1 is a block diagram of a communication system for carrying communications between a user terminal and remote destinations.

Referring to the drawings, FIG. 1 is a generalized block diagram of a communication system 10 suitable for carrying communications between a user terminal 12 and a plurality of destinations, represented by exemplary destinations A, B. The term "destination" is used to describe nodes A and B, because user terminal 12 is assumed to initiate communications to a given destination; in the exemplary embodiment, however, communications can pass in both directions between the user terminal and a given destination.

As shown in FIG. 1, user terminal 12 is coupled by an access link 14 to an access node 16. Access node 16 is then coupled by a link 18 to destination A and a link 20 to destination B. With this arrangement, communications can pass between user terminal 12 and destination A along the path comprising the access link 14, the access node 16 and link 18. Similarly, communications can pass between user terminal 12 and destination B along the path comprising the access link 14, the access node 16, and link 20.

It should be understood that this and other arrangements and processes described herein are set forth for purposes of example only, and other arrangements and elements (e.g., machines, interfaces, functions, orders of elements, etc.) can be added or used instead and some elements may be omitted altogether. Further, as in most telecommunications applications, those skilled in the art will appreciate that many of the elements described herein are functional entities that may be implemented as discrete components or in conjunction with other components, in any suitable combination and location.

In the arrangement of FIG. 1, destination A can be a different type of destination than destination B. For example, destination A can be a packet-terminated destination in that it sends and/or receives packets (e.g., IP packets or ATM cells) over link 18, while destination B can be a circuit-terminated destination in that it sends and/or receives channelized data streams (such as TDM signals for instance), whether or not framed, over link 20. Alternatively, the destinations can differ in other ways.

In turn, user terminal 12 can engage in various different types of communication sessions. Sessions can be distinguished based on the way both ends communicate (e.g., packet or circuit), based on the way only one end communicates, and/or based on other factors. As an example, if both user terminal 12 and destination A communicate data as a sequence of packets, a communication session between user 12 and destination A can be considered a packet-switched data session. And if both user terminal 12 and destination B communicate channelized data over a circuit, a communication session between user terminal 12 and destination B can be considered a circuit-switched data session.

As another example, if destination A communicates data as a sequence of packets, a communication session between user terminal 12 and destination A can be considered a packet-terminated data session. And if destination B communicates channelized data over a circuit, a communication session between user terminal 12 and destination B can be considered a circuit-terminated data session. Other examples are possible as well.

In a communication session that passes data over access link 14, the data may pass over the access link with a particular service level (or class of service), such as at a particular data rate or with some other designated quality of service. In the exemplary embodiment, the service level can be made to vary depending on the type of communication session or based on other factors. For example, upon setup of a given session, user terminal 12 might send a signaling message to access node 16, notifying access node 16 what type of communication session is being requested, and, based on the type of session, access node 16 might responsively instruct user terminal 12 to communicate at a particular service level over access link 14.

As a general matter, the service level over access link 14 may be better or more preferable (e.g., a higher data rate) for one type of communication session than for another type of communication session. Conversely, the service level for the other type of communication session will be lower or less preferable (e.g., a lower data rate). Thus, when user terminal 12 receives a request (e.g., a user request) to engage a given type of communication session, user terminal 12 and access node 16 might responsively communicate over access link at the lower, less preferable level for that type of communication session, which can be undesirable.

For example, the service level over access link 14 may be a higher data rate for packet-switched communication sessions than for circuit-switched communication sessions. Similarly, the service level over access link 14 may be a higher data rate for packet-terminated sessions than for circuit-terminated sessions. Thus, when user terminal 12 receives a request to engage in a circuit-switched session and/or a circuit-terminated session with destination B, user terminal 12 and access node 16 might responsively communicate over access link 14 at the lower data rate, rather than at the rate.

The exemplary embodiment helps overcome this limitation. In accordance with the exemplary embodiment, when user terminal 12 receives a request to establish a specified type of communication session with a specified destination, at least two separate communication sessions (or legs) will be set up and bridged together to form an end-to-end communication path between the user terminal and the specified destination.

A first session will be set up between the user terminal and an intermediate entity, passing over the access link. And a second session will be set up between the intermediate entity and the specified destination. Preferably, the first session will be of a type other than the specified type, and particularly of a type that results in a better service level over access link 14 than would result for the given type of session. In turn, the second session will preferably be the specified type of session. In the exemplary embodiment, the intermediate entity will perform the function of bridging together the first session and second session and may therefore be considered to be a "translation node."

Figure 2:
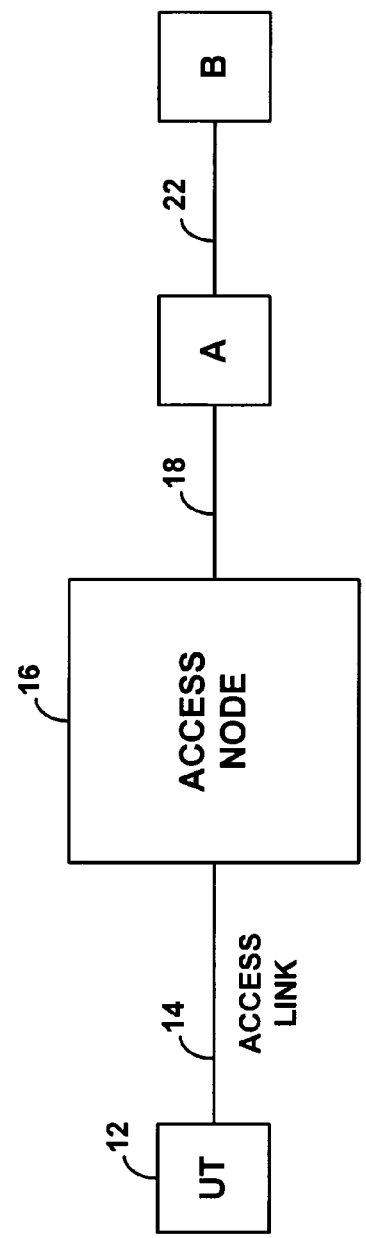
FIG. 2 is a block diagram depicting a revised version of the system of FIG. 1, in accordance with the exemplary embodiment.

This arrangement is illustrated by way of example in FIG. 2. FIG. 2 generally depicts a revised version of system 10, in which a communication link 22 is shown between exemplary destination A and exemplary destination B. (Link 20 between access node 16 and destination B has been omitted from the drawing for clarity, although it can still remain).

Referring to FIG. 2, assume that user terminal 12 receives a request to establish a circuit-switched data session (e.g., a dial-up data session) with destination B. In response, user terminal 12 will send a signaling message to access node 16 requesting establishment of a packet-switched data session, rather than a circuit-switched data session as requested. The requested packet-switched data session will then be set up between user terminal 12 and destination A, rather than destination B, via access link 14. Further, destination A will establish a circuit-switched data session with destination B, and destination A will bridge the packet-switched data session with the circuit-switched data session by converting between packetized data on one side and channelized data on the other side.

Thus, in this example, an end-to-end data session will be established between the user terminal and destination B. User terminal 12 will communicate data as packets, and destination B will communicate data as channelized data over a circuit. Advantageously, since the first leg of the end-to-end data session is a packet-switched leg that passes over access link 14, the data of the session can be carried over the access link at a higher service level allocated for packet-data sessions, rather than at a lower service level allocated for circuit-data sessions. Further, this can all be done transparently to a user of terminal 12, in response to the user's request for a circuit-switched data session.

2. Exemplary Wireless Architecture

The exemplary arrangement shown in FIG. 2 can take various forms, as noted above. As an example, access node 16 can represent or be part of a telecommunications access system, such as a carrier's network (e.g., a local exchange carrier's network, an interexchange carrier's network, or a cellular wireless carrier's network). Further, destination A can be a node within the carrier's network. The carrier may then receive a request from the user terminal to establish the specified type of session with destination B, and the carrier may responsively instead set up the first session between the user terminal and destination A and the second session between destination A and destination B.

The exemplary embodiment is particularly useful in the context of cellular wireless telephony, because, as noted above, the bandwidth that is allocated over the air interface between a mobile station and a base station is typically higher for packet-data sessions than for circuit-data (e.g., voice or dial-up) sessions. Applying the exemplary embodiment, when a wireless user terminal receives a request to establish a circuit-data session to a specified destination, the wireless user terminal can instead request a packet-data session. The wireless carrier can then set up the packet-data session with a intermediate node within the carrier's network, and the intermediate node can then set up a circuit-data session to the specified destination, bridging the two sessions together.

Figure 3:
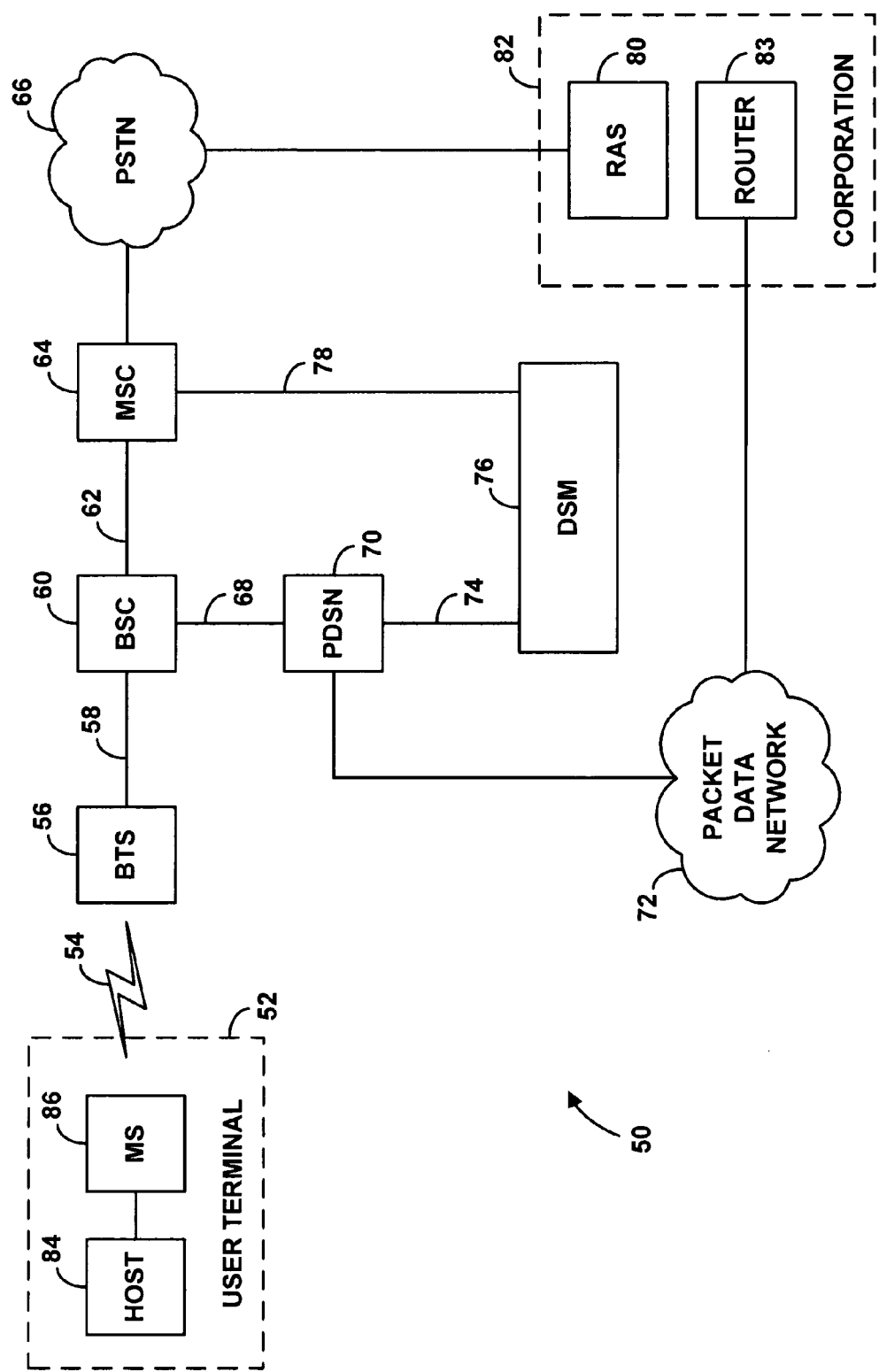
FIG. 3 is a block diagram of a wireless communication system suitable for carrying out the exemplary embodiment.

FIG. 3 is a generalized block diagram of a wireless communication system 50 suitable for carrying out the exemplary embodiment. As noted above, many variations on the arrangement and operation of this system are possible, so the following description should be viewed as exemplary only.

As shown in FIG. 3, system 50 includes a user terminal 52 coupled by an air interface 54 with a base transceiver station ("BTS") 56. The BTS is in turn coupled by a link 58 with a base station controller ("BSC") 60, and the BSC is coupled by a link 62 with a mobile switching center ("MSC") 64 that provides connectivity with the PSTN 66. BSC 60 is further shown coupled via a link 68 with a packet data serving node ("PDSN") 70 that provides connectivity with a packet data network 72 such as the Internet. In the exemplary embodiment, PDSN 70 is further coupled by a link 74 with a dial-up session manager ("DSM") 76, which is in turn coupled by a link 78 with MSC 64. Finally, PSTN 66 is shown providing connectivity with a remote access server ("RAS," i.e., dial-up server) 80, illustrated by way of example as part of corporate network 82 that also includes a router 83.

User terminal 52 can take any of a variety of forms. As shown in FIG. 3, for example, user terminal 52 can include a host 84 linked with a mobile station ("MS") device 86. The host device can be a personal computer (such as a notebook computer), a PDA or other device. The MS device can be a cellular telephone, a cellular wireless PC card or add-on module (e.g., for a PDA) or other such device that is capable of communicating over air interface 54 and communication with host 84 (typically by a pin-out port or other connection, and a suitable message set (API)). As such, the host can be linked to the MS device by a cable or wirelessly, or the MS device can be attached to or integrated into or as part of the host. Alternatively, the user terminal can be a unitary device that is capable of communicating over air interface 54.

Figure 4:
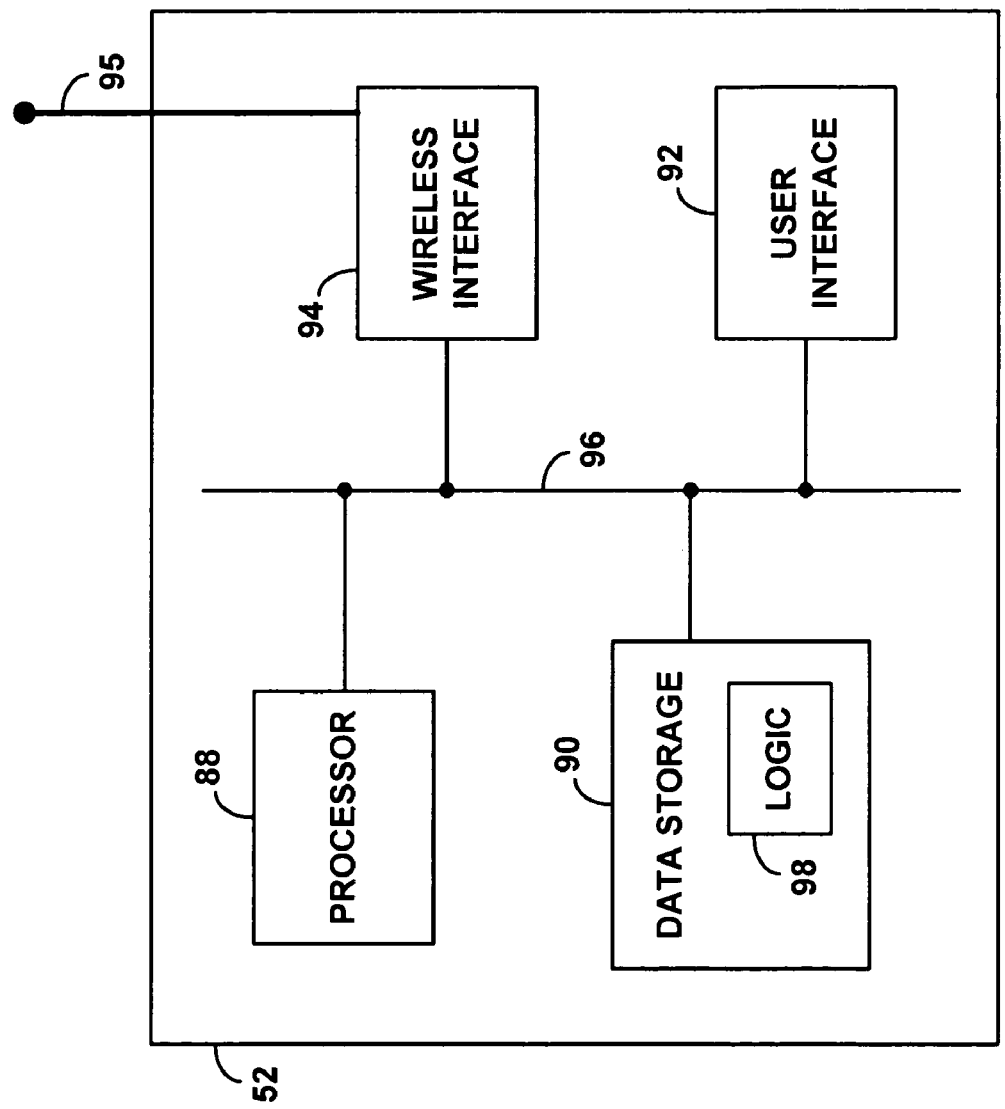
FIG. 4 is a block diagram of a user terminal for use in accordance with the exemplary embodiment.

FIG. 4 is a simplified block diagram of an exemplary user terminal 52. The functional blocks shown in the user terminal can be within host 84 or MS device 86 or otherwise part of the user terminal. As shown in FIG. 4, user terminal 52 includes a processor 88, data storage 90, user interface 92, and a wireless communication interface 94, each of which may be linked with a system bus 96.

Each of these components can take various forms. For instance, processor 88 may be an Intel Pentium class processor or a digital signal processor (which may integrate part or all of data storage 90) and data storage 90 may be memory and/or a storage drive. Further, user interface 92 can include a display or other mechanism (whether audio and/or visual) for presenting a graphical user interface ("GUI") to a user, as well as an input mechanism (e.g., keyboard, keypad, microphone, mouse, or touch-sensitive display) for receiving input from a user. Wireless communication interface 94 may include an antenna 95 for sending and receiving signals over air interface 54.

In the exemplary embodiment, data storage 90 holds a set of logic (e.g. computer instructions) 98 executable by processor 88 to carry out various functions described herein, such as sending a GUI to user-interface 92 be presented to a user, receiving a user request to establish a dial-up data session, responsively signaling to MSC 64 to set up a packet-data session, packetizing outgoing data (and depacketizing incoming data), including a "dial-up data session" identifier in each outgoing packet, and providing packets to wireless communication interface 94 for transmission over air interface 54. This logic can be stored on host 84 as a connection-manager application, so as to receive and respond to a user-request for a dial-up data session.

BTS 56, BSC 60 and MSC 64 can be conventional components of a radio access network, such as may be provided by Sprint PCS for instance and therefore are not described in detail here. (As examples, the BTS can be a Motorola SC4812, SC611, SC614, SC4850, the BSC can be a Nortel BSS or a Motorola CBSC, and the MSC can be Lucent 5ESS.) BTS 56 and BSC 60 may cooperatively be considered a base station. BTS 56 will include an antenna for communicating over air interface 54 with user terminal 52, and BSC 60 will function to control BTS 56. MSC 64 will, in turn, provide circuit-switching and connectivity with PSTN 66. In an alternative arrangement, the functionality of BSC 60 may be incorporated within MSC 64.

For purposes of example, air interface 54 will be assumed to be a code division multiple access (CDMA) air interface, so the entities that communicate over the air interface will communicate according to an agreed CDMA protocol (i.e., the will be programmed with the message sets and/or other technology necessary for engaging in that communication). For instance, industry standards EIA/TIA/IS-2000a ("IS-2000") and IS-95, published by the Electronics Industry Association/Telecommunications Industry Association, define a suitable CDMA protocol. However, other air interface arrangements are possible as well.

In normal operation, when user terminal wants to establish a circuit-data session with RAS 80 (e.g., in response to a user request to place a telephone call to a telephone number of RAS 80 for instance), user terminal will send an origination message over air interface 54 to MSC 64 (via BTS 56 and BSC 60). Under IS-95, the origination message will include an "option service code," which will indicate that the session is a voice session (or generally circuit-switched, rather than "data"), and the origination message will indicate the telephone number of the RAS. In response, the base station will begin to communicate with the user terminal over air interface at the voice bandwidth of, say, 9.6 or 14.4 kbps (such as in response to an instruction from MSC, or in response to BSC detection of the voice option service code in the origination message). Note that the voice bandwidth may itself vary depending on factors such as current congestion over the air interface or service-provider configuration, for instance.

Further, the MSC will send a signaling message (e.g., an ISDN User Part or "ISUP" setup message) over a signaling channel (e.g., SS7-based system through a signal transfer point (not shown)) to a switch (also not shown) that serves RAS 80, seeking to set up the circuit. Once the two ends agree to communicate (e.g., the RAS answers the call), circuit-switched communication then begins.

In a radio access network that provides packet-data connectivity (e.g., IS-2000), PDSN 70 can also be a conventional component, such as a Nortel Shasta 5000 or a CommWorks Total Control 1000. PDSN 70 normally functions as a gateway or router onto packet data network 72. As such, PDSN 70 may conventionally include a processor, a memory with program instructions executable by the processor, and a routing table for indicating where or how to route packets.

In existing practice, when user terminal 52 wants to establish a packet-switched data session with an entity on packet data network, such as router 83 for instance, user terminal 52 will similarly send an origination message to MSC 64 over air interface 54. The origination message, however, will include a "packet data" option service code and the network address of router 83. When MSC 64 receives the origination message, it will responsively instruct BSC 60 to pass the origination message to PDSN 70. PDSN 70 and user terminal 52 will then engage in a standard process to set up a point-to-point protocol ("PPP") packet-data session. (The process of setting up a PPP session is conventional and therefore not described here.)

Further, the base station will begin to communicate with the user terminal over air interface at the data bandwidth of, say, 144 kbps (pursuant to 3G 1xRTT) for instance (in response to an instruction from MSC, or in response to BSC detection of the data option service code in the origination message). As with the "voice" bandwidth, the data bandwidth may also vary depending on various factors, such as air interface congestion for instance.

With the PPP session established, user terminal 52 will packetize user data to produce data packets (such as IP packets) and send the packets over the air interface to PDSN (via the BTS and BSC). Each packet will conventionally include in a header the network address of router 83. Thus, applying its routing table, PDSN will determine where to route each such packet onto packet network 72, for transmission to router 83. Similarly, packets coming from router 83 to user terminal 52 will be directed to PDSN 70 and then sent via the PPP session to the user terminal.

In the exemplary embodiment, DSM 76 will function as the intermediate entity to which a packet-switched session with user terminal 52 is terminated and from which a circuit-switched session with RAS 80 is originated. As such, DSM 76 preferably includes functionality to communicate packet-data, to communicate circuit-data, to convert between packet-data and circuit-data, to initiate a circuit-switched data session, and to maintain a record of correspondence between a given packet-data session and a given circuit-data session.

Figure 5:
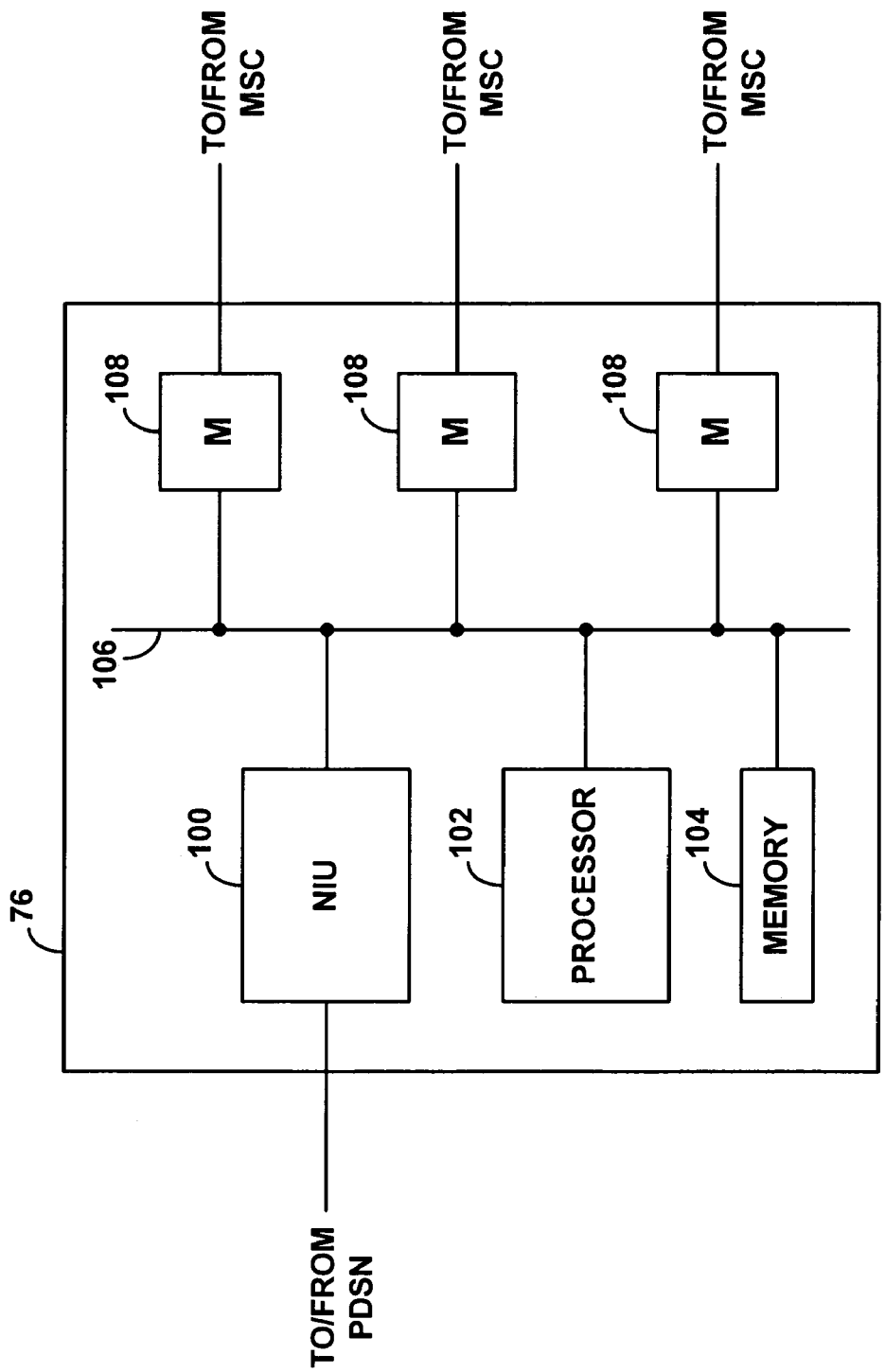
FIG. 5 is a block diagram of a dial-up session manager for use in accordance with the exemplary embodiment.

Referring to FIG. 5, an simplified block diagram of an exemplary DSM 76 is shown. Exemplary DSM 76 includes a network interface unit ("NIU") 100 for communicating packet-switched data with PDSN 70 over link 74. Link 74 may be an Ethernet link, in which case, NIU 100 can be an Ethernet port. DSM 76 further includes a processor 102 and a memory 104 containing program instructions executable by processor 102 to perform various functions described herein, such as initiating a circuit-switched session. The NIU, processor and memory can be combined together on an integral card, such as the EdgeServer card manufactured by 3Com Corporation for instance.

In the exemplary DSM 76, the NIU 100, processor 102 and memory 104 are coupled with a system bus 106. Also coupled with the system bus is a bank of high density modems (e.g., quad-modem cards) 108, each capable of communicating circuit-data over link 78. Link 78 can be a T1 line, in which case each modem is preferably capable of communicating channelized data over a T1 line. Each high density modem can be further capable of translating between packet-data and circuit-data. Thus, NIU 100 can receive packets and provide them to a modem 108, which can convert the packets into a digital bit stream (e.g., depacketize the packets and provide the underlying payload in a digital bit stream, or simply embed the entire packets in a digital bit stream) and send that bit stream over a T1 line to MSC 64, and vice versa.

Advantageously, DSM 76 can be based on a conventional entity that is also commonly used in cellular radio access networks providing packet-data connectivity, namely, an interworking function ("IWF"), such as the CommWorks Total Control 1000 for instance. An IWF, which is a network access server, generally functions to provide connectivity between an MSC and a packet-switched network such as the Internet in an environment where a mobile station does not itself communicate packetized data. It also translates between CDMA standards and PSTN standards for circuit data. The IWF communicates circuit-data from the MSC and communicates packet-data with the Internet. As such, an exemplary IWF will typically have the components shown in FIG. 5. However, rather than coupling the NIU with the Internet, the NIU can be instead coupled with an Ethernet link to the PDSN 70 as described above. Further, processor 102 can be programmed with an application to perform functions as also described above.

3. Exemplary Wireless Operation

Figure 6:
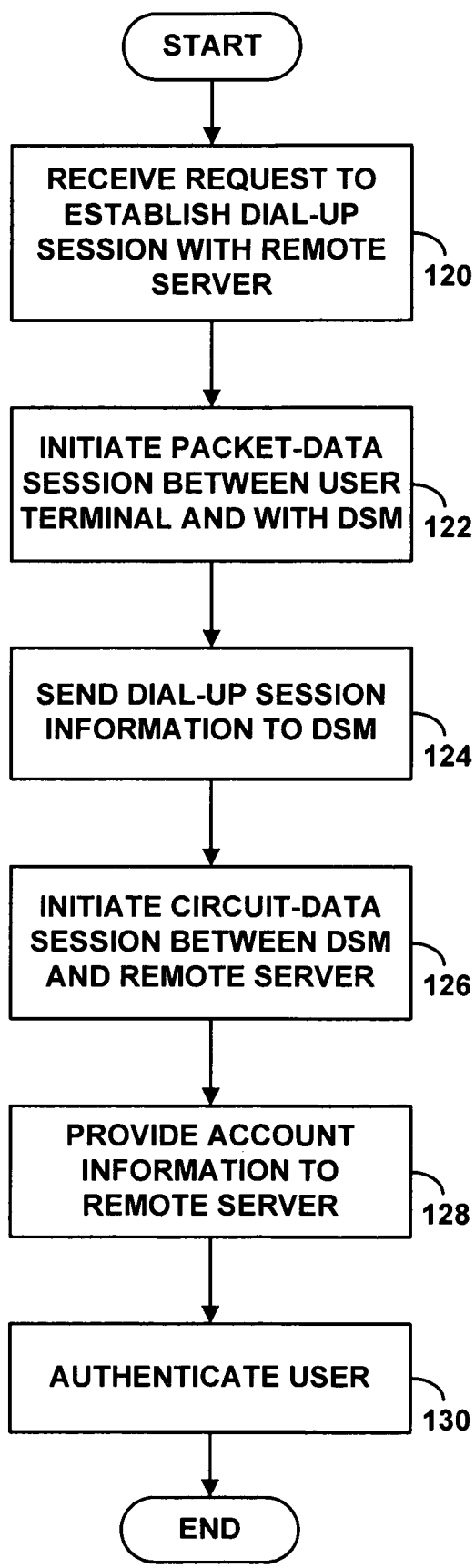
FIGS. 6–8 are flow charts depicting functions performed in accordance with the exemplary embodiment.
Figure 7:
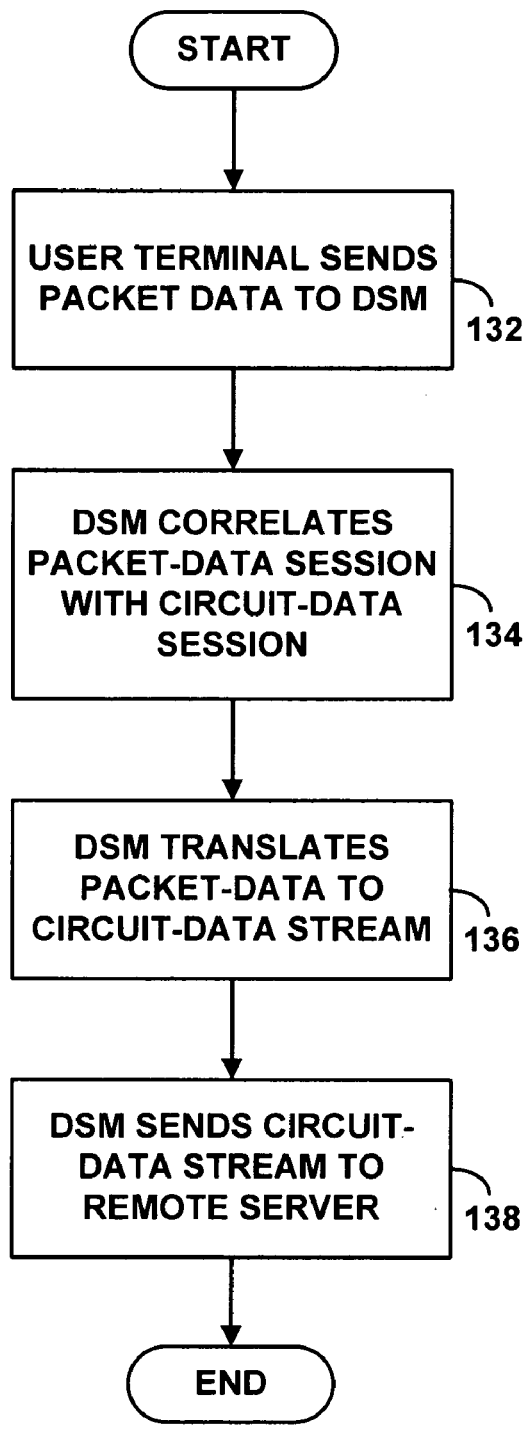
Figure 8:
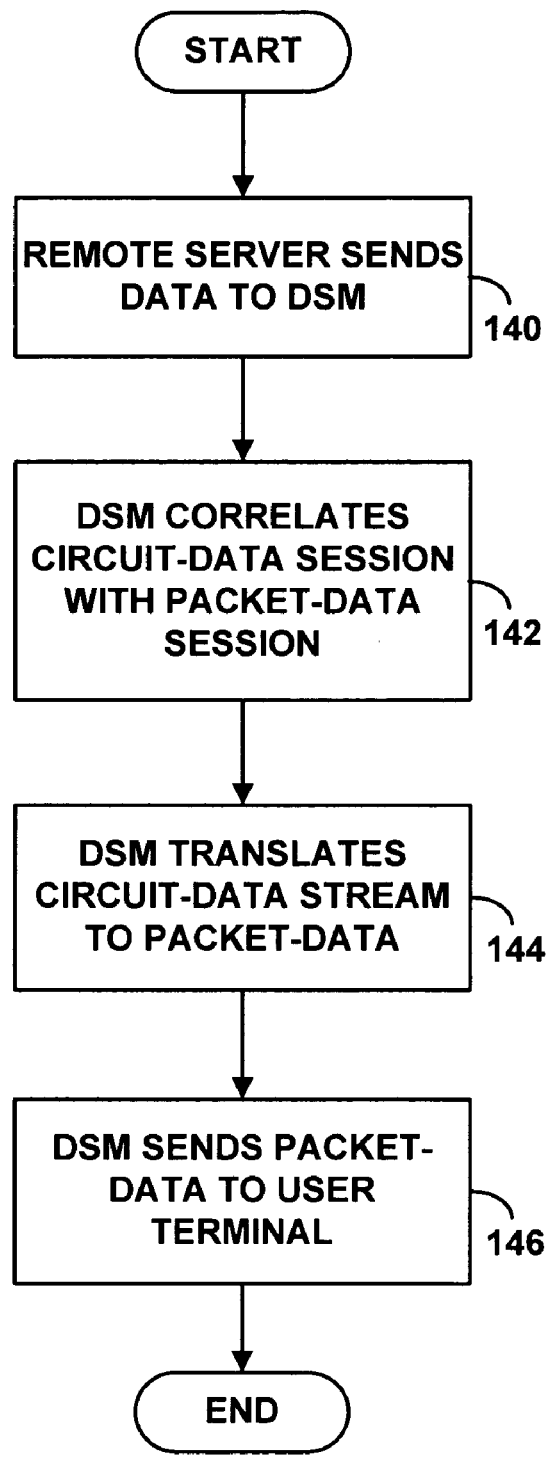

Referring now to FIGS. 6, 7 and 8, flow charts are provided to help illustrate exemplary functions that can be performed with the arrangement shown in FIG. 3. As shown in FIG. 6, at block 120, user terminal 52 first receives a request to establish a dial-up session with RAS 80. In the exemplary embodiment, the request can come from a user or from another machine.

For instance, a user can operate host 84 to invoke a dial-up data session application. The application may present the user with a GUI-form via user interface 92, which may include text boxes or other objects by which a user can enter the telephone number of RAS 80 as well as a username and password that the user normally employs as account information to gain access to the network served by RAS 80.

At block 122, in response to the request, the user terminal will initiate a packet-data session with DSM 76. Thus, in this example, the user terminal will send an IS-2000 origination message to MSC 64 via air interface 54, BTS 56 and BSC 60, including in the origination message a parameter identifying the session as a "packet data" session (rather than a voice/circuit session). In response, MSC 64 will instruct BSC 60 to pass the origination message to PDSN 70. PDSN 70 and user terminal 52 will then set up a PPP session.

In the exemplary embodiment, in order to complete establishment of the packet-data session between user terminal 52 and DSM 76, a mechanism will be provided to cause packets that are sent from user terminal 52 to PDSN 70 (in the PPP session) to be forwarded to DSM 76. To do so, user terminal 52 can be programmed to include in each packet of the data session a predetermined identifier, and PDSN 70 can be programmed to detect that predetermined identifier and responsively route the packet via link 74 to DSM 76.

Conveniently, the identifier can be a unique (e.g., normally non-routable) IP address, such as a private IP address of the form 10.x.x.x, as the destination address in each packet. By recording in the routing table of PDSN 70 that any packet destined to that IP address should be routed to DSM 76, the PDSN can be readily set to forward all such packets to the DSM. Alternatively, the identifier can take other forms as well, whether within each packet header or payload. Further, other methods can be employed to set up a packet-data session between the user terminal and the DSM.

The packet-data session between user terminal 52 and DSM 76 can have a unique session ID, assigned by DSM 76 for instance. In the exemplary embodiment, DSM 76 will store in its memory a record of the session ID, which DSM 76 can use to correlate the session with a circuit-data session established between DSM 76 and RAS 80.

At block 124, the user terminal will send to DSM 76 a set of information concerning the requested dial-up data session. This information preferably includes (i) the telephone number of RAS 80, (ii) the username, and (iii) the password. The user terminal can send this information to DSM 76 in any way, over any channel, before, during or after initiation of the packet-data session. In the exemplary embodiment, however, the user terminal will send the information as payload in packets to DSM 76.

For instance, the user terminal may be programmed to include a dial-up data code at the beginning of a payload block of a packet, followed by the information. The DSM 76 may then be programmed to detect the dial-up data code as an indication that the remainder of the payload block defines the information. DSM 76 may then extract the information from the packet and store the information in memory.

At block 126, DSM 76 will then initiate a dial-up data session (i.e., a circuit-data session) to the telephone number of RAS 80. In particular, a modem of DSM 76 will send the telephone number as dialed digits over link 78 to MSC 64. MSC 64 will then engage in ISUP signaling to set up the circuit-data session to RAS 80. When a remote modem of RAS 80 answers, the remote modem and the DSM modem will agree on a communication protocol and will begin communicating.

At block 128, once the circuit-data session is established between DSM 76 and RAS 80, DSM 76 will provide RAS 80 with the username and password that it received from user terminal 52. At block 130, RAS 80 can then authenticate the user and allow the data session to continue.

Since the circuit-data session occurs over a circuit, DSM 76 can record in its memory an indication of the circuit (e.g., port, telephone line, etc.) over which the session is occurring. Further, DSM 76 will record a correlation between that circuit and the session ID of the packet-data session between the user terminal and the DSM, so that the DSM can bridge the two sessions together.

Referring now to FIG. 7, end-to-end data communication can thus occur from user terminal 52 to RAS 80. As shown in FIG. 7, at block 132, user terminal 52 will then packetize user data (data to be sent to RAS 80) and send resulting outgoing packetized data via the packet-data session to DSM 76. At block 134, upon receipt of the packets, DSM 76 will reference its memory and thereby determine that the outgoing packetized data corresponds to the circuit-data call with RAS 80. Thus, at block 136, DSM 76 will translate the outgoing packetized data into an outgoing circuit-data stream, and, at block 138, DSM 76 will send the outgoing circuit-data stream in the circuit-data session to RAS 80.

Similarly, referring to FIG. 8, end-to-end data communication can occur from RAS 80 to user terminal 52. At block 140, for instance, RAS 80 will send incoming circuit-data to DSM 76. At block 142, upon receipt of the incoming circuit-data, DSM 76 will reference its memory and thereby determine that the incoming circuit-data corresponds to the packet-data session with user terminal 52. Therefore, at block 144, DSM 76 will translate the circuit-data into incoming packetized data, and, at block 146, DSM 76 will route the incoming packetized data in the packet-data session to user terminal 52.

4. Adding Wireless Mobility

In the exemplary embodiment depicted in FIG. 3, a mobile-IP "home agent" of user terminal 52 can be interposed between PDSN 70 and DSM 76 in order to provide mobility during a data session. Applying mobile-IP principles, when DSM 76 is going to send a packet to user terminal 52, DSM 76 can instead send the packet to the terminal's home agent. The home agent can then conventionally forward the packet to the user terminal, wherever the terminal may currently be located. Similarly, when user terminal 52 is going to send a packet of data destined for RAS 80, user terminal 52 can send the packet via PDSN 70 to the home agent, and the home agent can forward the packet to DSM 76. Other methods of providing mobility are possible as well.

5. CONCLUSION

An exemplary embodiment of the present invention has been described above. Those skilled in the art will understand, however, that changes and modifications may be made to this embodiment without departing from the true scope and spirit of the present invention, which is defined by the claims.

We claim:

1. In a network of the type comprising an access link for communicatively coupling user terminals with an access node, wherein the access node provides connectivity with a plurality of destinations including packet-terminated destinations and circuit-terminated destinations, and wherein communications from user terminals to a packet-terminated destination, when carried over the access link, are carried over the access link at a first service level, and communications from user terminals to a circuit-terminated destination, when carried over the access link, are carried over the access link at a second service level different than the first service level, a method comprising:
    (a) receiving a user request to establish a communication session from a user terminal to a specified circuit-terminated destination; and
    (b) in response to the user request, (i) setting up a first session from the user terminal to an intermediate packet-terminated destination via a communication path including the access link, so that the first session is carried over the access link at the first service level, (ii) setting up a second session from the intermediate packet-terminated destination to the specified circuit-terminated destination, and (iii) bridging the first session with the second session to produce an end-to-end session from the user terminal to the specified destination,
    wherein the first service level comprises a first data rate for communication over the access link, and the second service level comprises a second data rate for communication over the access link, the first data rate being higher than the second data rate.

2. The method of claim 1, wherein the access link comprises an air interface.

3. The method of claim 1, wherein the user terminal comprises a mobile station and the access node comprises a base station.

4. The method of claim 3, wherein the user terminal further comprises a host device linked with the mobile station.

5. The method of claim 1, wherein the user request to establish a communication session from a user terminal to the specified circuit-terminated destination comprises a request to establish a dial-Lip data connection from the user terminal to a telephone number of the specified circuit-terminated destination.

6. The method of claim 5, further comprising receiving the user request at the user terminal.

7. The method of claim 6, wherein setting up the first session from the user-terminal to the intermediate packet-terminated destination comprises:
    sending an origination message from the user terminal to the access node.

8. The method of claim 7, further comprising:
    sending the telephone number of the specified circuit-terminated destination from the user terminal to the access node; and
    sending the telephone number of the specified circuit-terminated destination from the access node to the intermediate packet-terminated destination.

9. The method of claim 5, wherein setting up the second session from the intermediate packet-terminated destination to the specified circuit-terminated destination comprises:
    the intermediate packet-terminated destination placing a dial-up call to the telephone number.

10. The method of claim 9, wherein the user request defines user-account information, the method further comprising:
    sending the user-account information from the user terminal to the access node;
    sending the user-account information from the access-node to the intermediate packet-terminated destination; and
    sending the user-account information from the intermediate packet-terminated destination to the specified circuit-terminated destination.

11. The method of claim 10, wherein the user account information comprises a username and a password.

12. The method of claim 1, wherein setting up the first session from the user-terminal to the intermediate packet-terminated destination comprises setting up the first session over an air interface.

13. The method of claim 12, wherein setting up the first session from the user-terminal to the intermediate packet-terminated destination comprises the user terminal sending an origination message over the air interface to a radio access system, the origination message including a packet-data service code.

14. The method of claim 12, wherein setting up the first session from the user-terminal to the intermediate packet-terminated destination comprises:
    setting up a PPP session between (i) the user terminal and (ii) an entity that is arranged to forward packets of the session to the intermediate packet-terminated destination.

15. The method of claim 12, wherein each of a plurality of packets sent from the user terminal to the intermediate packet-terminated destination in the first session comprises an identifier, and wherein setting up the first session from the user terminal to the intermediate packet-terminated destination comprises:
    setting up a PPP session between (i) the user terminal and (ii) an entity that is arranged to forward each packet to the intermediate packet-terminated destination in response to a determination that the packet includes the identifier.

16. The method of claim 15, further comprising:
programming the entity to forward to the intermediate packet-terminated destination each packet that includes the identifier.

17. The method of claim 15, wherein the identifier comprises a predetermined network address.

18. The method of claim 1, further comprising:
performing step (b) transparently to the user.

19. The method of claim 1, further comprising:
using a network access server as the intermediate packet-terminated destination.

20. A system comprising a user terminal including:
a first processor;
a first data storage mechanism;
a first communication interface for communicating over an air interface;
a first user-input means for receiving a user request to establish a dial-up data session with a specified circuit-terminated destination;
a first set of instructions stored in the first data storage mechanism and executable by the first processor, in response to the user request, (i) to send a session-setup message via the air interface requesting establishment of a packet-data session and (ii) once the packet-data session is established, to send packets that include dial-up data as payload and that include a predetermined identifier associated with a dial-up data session;

a translation node including (a) a second processor, (b) a second data storage mechanism, (c) a second communication interface for receiving packet-data, the second communication interface receiving the packets and providing the packets to the second processor, (d) a third communication interface for sending circuit-data, and (e) a second set of instructions stored in the second data storage mechanism and executable by the second processor (i) to translate the packets into outgoing circuit-data and (ii) to provide the outgoing circuit-data to the third communication interface for transmission of the outgoing circuit-data to the specified circuit-terminated destination; and an entity including (a) a third processor, (b) a third data storage mechanism, (c) a fourth communication interface for communicating packet-data, the fourth communication interface receiving the packets and providing the packets to the third processor, and (d) a third set of instructions stored in the third data storage medium and executable by the third processor, for each packet, to detect the predetermined identifier in the packet and to responsively send the packet to the translation node.

21. The system of claim 20, wherein the entity is a PDSN.

* * * * *